(12) United States Patent
Tsutsumi

(10) Patent No.: US 7,652,957 B2
(45) Date of Patent: Jan. 26, 2010

(54) LENS DRIVING MECHANISM AND IMAGE PICKUP DEVICE

(75) Inventor: Takuya Tsutsumi, Tokyo (JP)

(73) Assignee: Sony Corporation, Tokyo (JP)

( * ) Notice: Subject to any disclaimer, the term of this patent is extended or adjusted under 35 U.S.C. 154(b) by 472 days.

(21) Appl. No.: 11/130,136

(22) Filed: May 17, 2005

(65) Prior Publication Data

US 2005/0276172 A1 Dec. 15, 2005

(30) Foreign Application Priority Data

Jun. 15, 2004 (JP) ............................. 2004-177158

(51) Int. Cl.
*G11B 7/00* (2006.01)
(52) U.S. Cl. .................... 369/44.14; 720/683
(58) Field of Classification Search .................. 396/55; 359/694; 73/618; 369/44.14, 44.15, 44.22; 348/360; 720/683
See application file for complete search history.

(56) References Cited

U.S. PATENT DOCUMENTS

| | | | | |
|---|---|---|---|---|
| 5,136,558 A | * | 8/1992 | Getreuer et al. | 369/44.15 |
| 5,721,969 A | * | 2/1998 | Arai | 396/55 |
| 5,905,598 A | * | 5/1999 | Shimada et al. | 359/694 |
| 5,905,917 A | * | 5/1999 | Imura | 396/55 |
| 5,926,656 A | * | 7/1999 | Imura et al. | 396/55 |
| 5,995,762 A | * | 11/1999 | Enomoto et al. | 396/55 |
| 6,112,028 A | * | 8/2000 | Okada | 396/55 |
| 6,591,066 B2 | * | 7/2003 | Aoshima | 396/133 |
| 2002/0112543 A1 | * | 8/2002 | Noguchi | 73/618 |
| 2003/0184886 A1 | * | 10/2003 | Wakabayashi et al. | 359/819 |

* cited by examiner

*Primary Examiner*—Peter Vincent Agustin
(74) *Attorney, Agent, or Firm*—Oblon, Spivak, McClelland, Maier & Neustadt, L.L.P.

(57) ABSTRACT

A lens driving mechanism eccentrically drives at least one lens or lens subunit, hereunder called a correcting lens, in a lens system constituting a taking lens unit in a plane perpendicular to an optical axis direction, and includes a movable frame holding the correcting lens, two coils fixed at a lens barrel where the taking lens unit is disposed, and magnetic circuit formation members generating a magnetic field crossing the coils that are disposed around the correcting lens when viewed in the optical axis direction of the taking lens unit. The members include at least two magnets and yokes disposed at each of the two coils for generating movement forces in different directions perpendicular to the optical axis. The yokes oppose the respective magnets. Either the magnets or the yokes are held by the movable frame, and the other of the magnets and yokes are secured to the lens barrel.

12 Claims, 14 Drawing Sheets

LENS DRIVING MECHANISM AND IMAGE PICKUP DEVICE

CROSS REFERENCES TO RELATED APPLICATIONS

The present invention contains subject matter related to Japanese Patent Application JP 2004-177158 filed in the Japanese Patent Office on Jun. 15, 2004, the entire contents of which are incorporated herein by reference.

BACKGROUND OF THE INVENTION

1. Field of the Invention

The present invention relates to a novel lens driving mechanism and a novel image pickup device. More specifically, the present invention relates to a technology which makes it possible to achieve size reduction, in particular, size reduction of a lens barrel in a diametrical direction thereof.

2. Description of the Related Art

Recently, there is a demand for, along with automating a focusing operation and exposure determination, automatically overcoming image blurring caused by a movement of a camera occurring when pushing a shutter button, that is, shooting an image that one wants to shoot so that it is sharp without requiring any skill in correcting the camera movement.

There are broadly two methods of correcting camera movement: an electronic method and an optical method. The optical method is carried out by detecting any camera movement perpendicular to an optical axis with a sensor and shifting a correcting lens perpendicularly to the optical axis so as to correct the amount of movement.

Many related optical camera movement correcting mechanisms using a moving coil for moving a correcting lens have been proposed. A lens driving mechanism in such camera movement correcting mechanisms is disclosed in Japanese Unexamined Patent Application Publication No. 7-98470.

The lens driving mechanism disclosed in the aforementioned document is schematically illustrated in FIG. 14 and described.

A correcting lens 71 is supported by a supporting frame 72. The supporting frame 72 is supported by a support shaft 74y, secured to a supporting arm 75, so as to be slidable in a Y direction perpendicular to an optical axis of the correcting lens 71. The supporting arm 75 is supported by a support shaft 74p, secured to a lens barrel 710, so as to be slidable in an X direction perpendicular to the optical axis of the correcting lens 71 and the Y direction. Therefore, the supporting frame 72 supporting the correcting lens 71 is movable along with the supporting arm 75 in the X direction with respect to the lens;,barrel 710, and in the Y direction with respect to the lens barrel 710 and the supporting arm 75.

Two coils, that is, a Y-direction driving coil 79y and an X-direction driving coil 79p are supported by the supporting frame 72. Magnets and yokes (not shown) for the respective coils 79y and 79p are disposed at the lens barrel 710.

When the coil 79y is energized, a thrust is generated in a Y direction in the coil 79y, causing the supporting frame 72 to move in the Y direction with respect to the lens barrel 710 and the supporting shaft 75. When the coil 79b is energized, a thrust is generated in an X direction in the coil 79p, causing the supporting frame 72 to move, along with the supporting arm 75, in the X direction with respect to the lens barrel 710.

By virtue of the above-described structure, the supporting shaft 72, that is, the lens 71 can move in all directions perpendicular to the optical axis thereof.

In the lens driving mechanism disclosed in the aforementioned document and shown in FIG. 14, since a structure in which the direction of movement of movable members (the supporting frame 72 and the supporting arm 75) is guided by guide shafts (the supporting shafts 74y and 74p) is used, two movable members (the supporting frame 72 and the supporting arm 75) are required for shifting the correcting lens 71 in all directions perpendicular to the optical axis thereof. This means that the structure includes two movable members that are disposed above and below each other vertically. Therefore, the structure inevitably becomes sophisticated and large.

To overcome this problem, a lens driving mechanism (shown in FIG. 15) using only one movable member by opposing the movable member with respect to a stationary member, such as a housing, via small balls has been proposed.

In the lens driving mechanism shown in FIG. 15, with three small balls d, d, and d being interposed between a movable frame b holding a correcting lens a and a stationary frame c secured to a lens barrel (not shown), a coil spring g is compressed between the movable frame b and a spring holding frame f held by the stationary frame c with screws e and e, and the movable frame b is biased towards the stationary frame c via the small balls d, d, and d by the resiliency of the coil spring g. This allows the movable frame b to move in an X direction or a Y direction by the resiliency of the coil spring g and the opposing force resulting from contact of the movable frame b with the small balls d, d, and d while the movable frame b is being held in the optical axis direction.

Two coils hx and hy are held by the movable frame b, and magnets jx and jy are held by the stationary frame c so that the respective coils hx and hy are disposed between the stationary frame c and a yoke i. Energizing the coil hx generates a thrust in an X axis direction in the coil hx, causing the movable frame b holding the coil hx and thus the correcting lens a to move in the X axis direction. Energizing the coil hy causes a thrust to be generated in a Y axis direction in the coil hy, causing the movable frame b holding the coil hy and thus the correcting lens a to move in the Y axis direction. Therefore, energizing the coils hx and hy as required causes the movable frame b and thus the correcting lens a to move in the X-axis direction and the Y-axis direction.

The lens driving mechanism shown in FIG. 15 only needs one movable member, so that the structure of the lens driving mechanism is simplified, and its size is reduced.

SUMMARY OF THE INVENTION

In the lens driving mechanisms disclosed in the aforementioned document and shown in FIG. 15, however, since the coils 79y and 79p are disposed, each at its associated one end that is displaced from the center of the supporting frame 72 in its associated one direction, the coils hx and hy are disposed, each at its associated one end that is displaced from the center of the movable frame b in its associated one direction, the magnets are disposed so as to oppose the coils 79y and 79p, and the magnets jx and jy are disposed so as to oppose the coils hx and hy, the maximum outside diameters of the lens driving mechanisms perpendicularly to the optical axes thereof become large at the locations where the coils 79y and 79p and the magnets are disposed and at the locations where the coils hx and hy and the magnets jx and jy are disposed, respectively. This hinders size reduction of the lens barrels.

It is desirable to reduce the maximum outside diameter of a lens driving mechanism in a direction perpendicular to an optical axis thereof.

A lens driving mechanism according to an embodiment of the present invention includes a movable frame holding a correcting lens, two coils fixedly disposed at a lens barrel where a taking lens unit is disposed, and magnetic circuit formation members generating a magnetic field that crosses the coils. The coils are disposed around the correcting lens when viewed in the optical axis direction of the taking lens unit. The magnetic circuit formation members include at least two magnets and yokes disposed at each of the two coils for generating movement forces in different directions perpendicular to the optical axis. The yokes oppose the respective magnets. Either the magnets or the yokes are held by the movable frame, and the other of the magnets and yokes are secured to the lens barrel.

An image pickup device according to another embodiment of the present invention includes a taking lens unit, an image pickup element converting an optical image formed by the taking lens unit into an electrical signal, and a lens driving mechanism for eccentrically driving at least one lens or lens subunit, hereunder called a correcting lens, in a lens system constituting the taking lens unit in a plane perpendicular to an optical axis direction. The lens driving mechanism includes a movable frame holding the correcting lens, two coils fixedly disposed at a lens barrel where the taking lens unit is disposed, and magnetic circuit formation members generating a magnetic field that crosses the coils. The coils are disposed around the correcting lens when viewed in the optical axis direction of the taking lens unit. The magnetic circuit formation members include at least two magnets and yokes disposed at each of the two coils for generating movement forces in different directions perpendicular to the optical axis. The yokes oppose the respective magnets. Either the magnets or the yokes are held by the movable frame, and the other of the magnets and yokes are secured to the lens barrel.

Therefore, according to each of the embodiments of the present invention, the maximum outside diameter of the lens driving mechanism is reduced.

The lens driving mechanism according to the embodiment eccentrically driving at least one lens or lens subunit, hereunder called a correcting lens, in a lens system constituting a taking lens unit in a plane perpendicular to an optical axis direction. As mentioned above, it includes a movable frame holding the correcting lens, two coils fixedly disposed at a lens barrel where the taking lens unit is disposed, and magnetic circuit formation members generating a magnetic field that crosses the coils. The coils are disposed around the correcting lens when viewed in the optical axis direction of the taking lens unit. The magnetic circuit formation members include at least two magnets and yokes disposed at each of the two coils for generating movement forces in different directions perpendicular to the optical axis. The yokes oppose the respective magnets. Either the magnets or the yokes are held by the movable frame, the other of the magnets and yokes are secured to the lens barrel.

As mentioned above, image pickup device according to another embodiment of the present invention includes a taking lens unit, an image pickup element converting an optical image formed by the taking lens unit into an electrical signal, and a lens driving mechanism for eccentrically driving at least one lens or lens subunit, hereunder called a correcting lens, in a lens system constituting the taking lens unit in a plane perpendicular to an optical axis direction. The lens driving mechanism includes a movable frame holding the correcting lens, two coils fixedly disposed at a lens barrel where the taking lens unit is disposed, and magnetic circuit formation members generating a magnetic field that crosses the coils. The coils are disposed around the correcting lens when viewed in the optical axis direction of the taking lens unit. The magnetic circuit formation members include at least two magnets and yokes disposed at each of the two coils for generating movement forces in different directions perpendicular to the optical axis. The yokes oppose the respective magnets. Either the magnets or the yokes are held by the movable frame, and the other of the magnets and yokes are secured to the lens barrel.

Therefore, according to each of the embodiments, since the coils are disposed as single-wound coils at the peripheral portions of the movable frame, and, therefore, the magnets have sizes in correspondence with the sizes of their respective single-wound coils, the maximum outside diameter of the movable frame and the stationary frame opposing the movable frame in the structure including the single-wound coils is less than that in a related structure where double coils are disposed at the peripheral portions of a movable frame. Therefore, the maximum outside diameter of the lens driving mechanism can be reduced, so that a maximum outside diameter of the portion of the lens barrel where the lens driving mechanism is disposed can be reduced.

In each of the embodiments, it is possible that the two coils have substantially rectangular shapes whose long axis directions are perpendicular to each other, the at least two magnets disposed at each coil include two magnets, the two magnets at one of the coils oppose each other at both ends of the coil in its long axis direction, and the two magnets at the other coil oppose each other at both ends of the other coil in its long axis direction. Therefore, a center-of-gravity position and a central position of the movable frame can substantially coincide with each other, so that the direction of a thrust generated between the coils and the respective magnets and the respective yokes act through the center of gravity of the movable frame. Consequently, when the thrust is generated, a force acting in a direction in which the movable frame is rotated does not act upon the movable frame, that is, the movable frame does not roll.

In the lens driving mechanism according to the embodiment, at least three small balls may be interposed between the movable frame and the lens barrel, and rotation of the small balls move the movable frame with respect to the lens barrel. Therefore, a lens driving mechanism having a simple structure, that is, a structure that is not a double structure and that includes the two movable members for allowing movement in two respective directions perpendicular to each other can be provided.

In the lens driving mechanism according to the embodiment, the yokes may be substantially annular. Therefore, flux leakage is reduced and the magnetic efficiency is thus improved, so that a large thrust can be generated by a small electrical power. Since a magnetic attraction force acts upon the movable frame so that the center of the movable frame moves closer to the central position of the substantially annular yokes, if the center of the annular yokes is made to coincide with the optical axis, the movable frame is centered with respect to the optical axis.

In the lens driving mechanism according to the embodiment, a radial width of a portion of each yoke opposing its associated magnet or a radial width of the portion of each yoke opposing its associated magnet and a portion near the portion of each yoke opposing its associated magnet may be larger than a radial width of any other portion of each yoke so that a magnetic flux density at the portion of each yoke opposing its associated magnet is greater than a magnetic flux density at the any other portion of each yoke. Therefore, when the effectiveness of the centering is ensured, if rolling occurs, the rolling is corrected, as a result of which a force which tries to restore the movable frame to its original state is applied.

DESCRIPTION OF THE PREFERRED EMBODIMENTS

Figure 1:
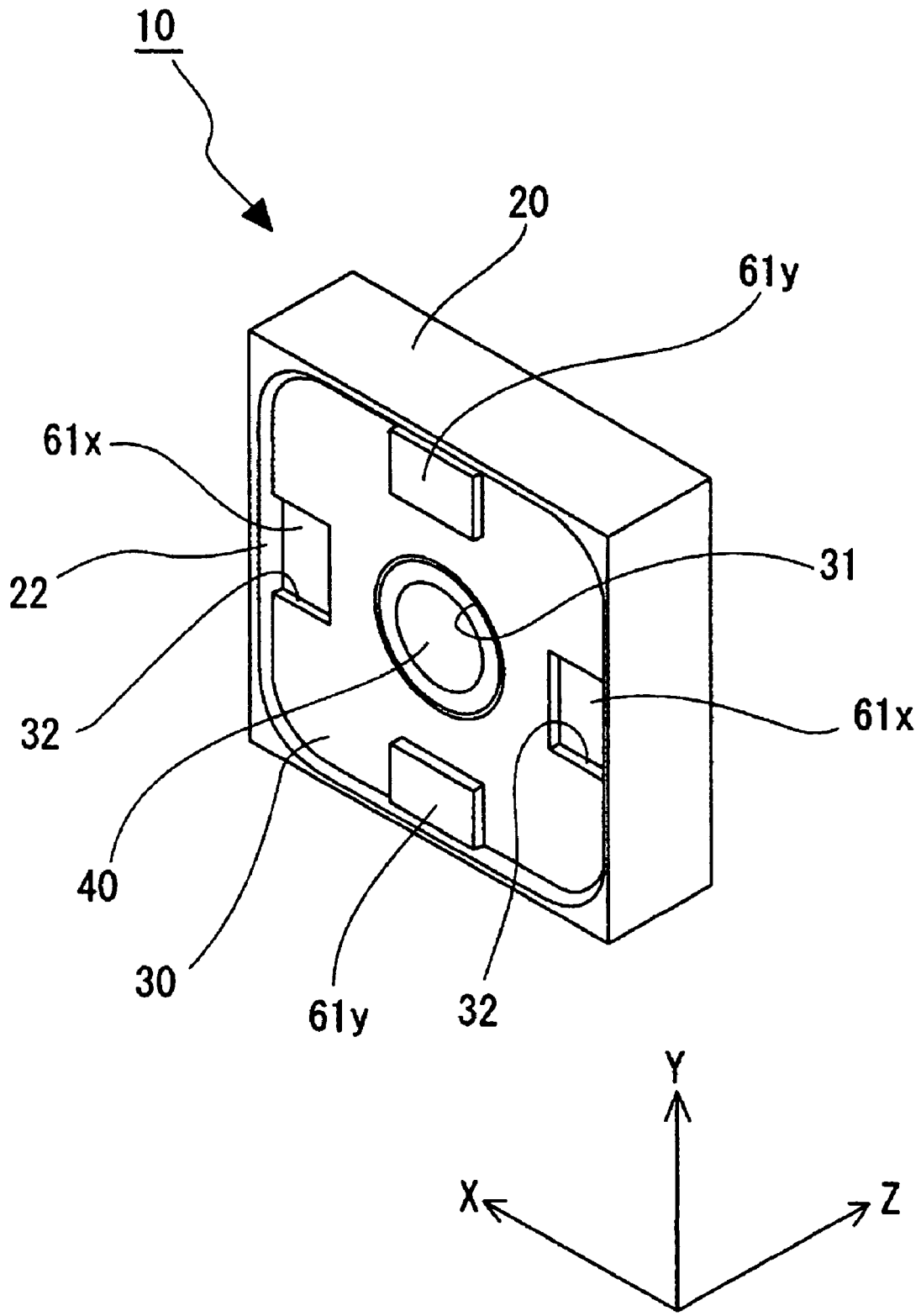
FIG. 1 illustrates, along with FIGS. 2 to 6, a lens driving mechanism according to a first embodiment of the present invention, and is a perspective view of the entire lens driving mechanism.
Figure 2:
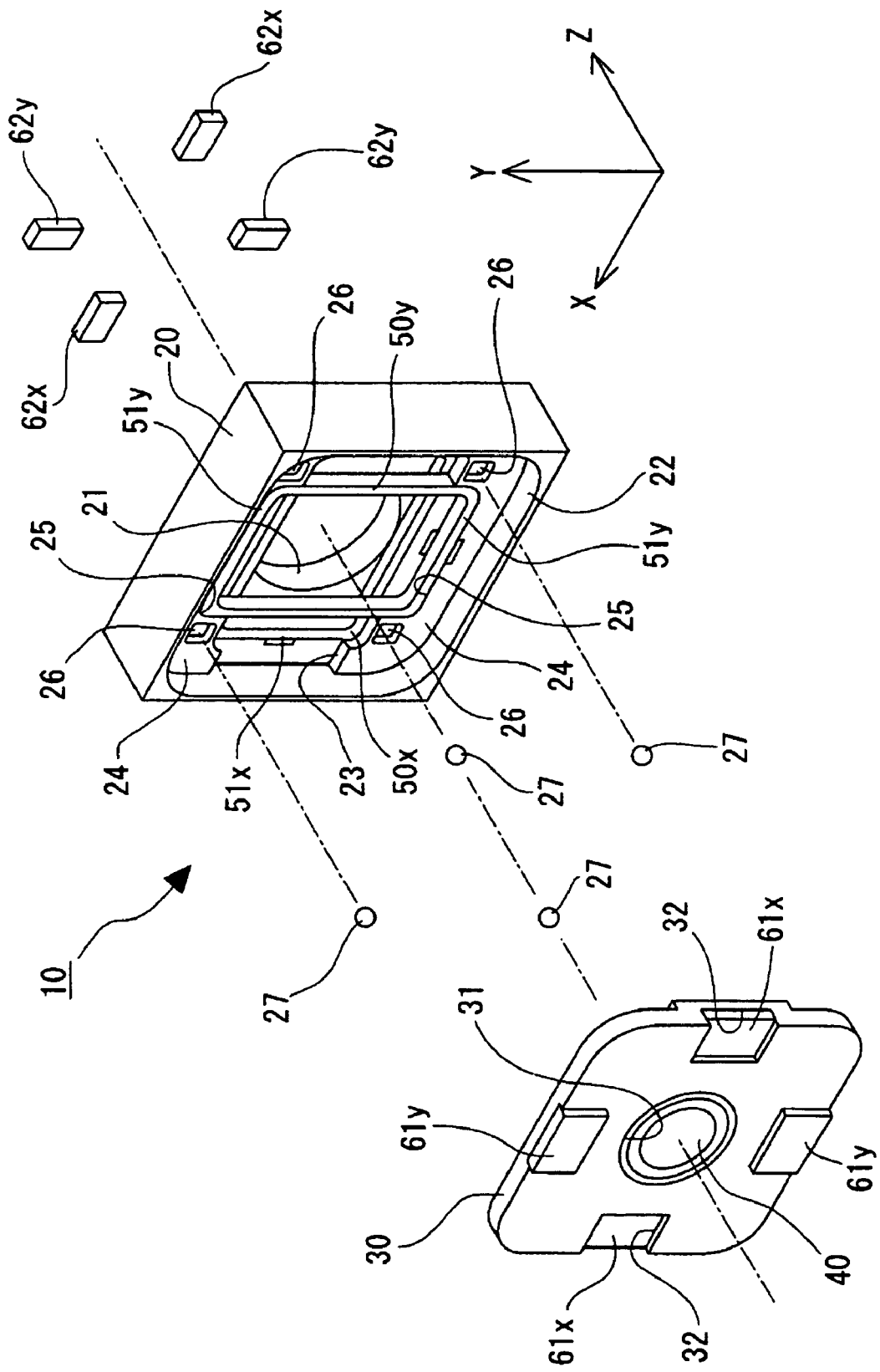
FIG. 2 is an exploded perspective view of the entire lens driving mechanism.
Figure 3:
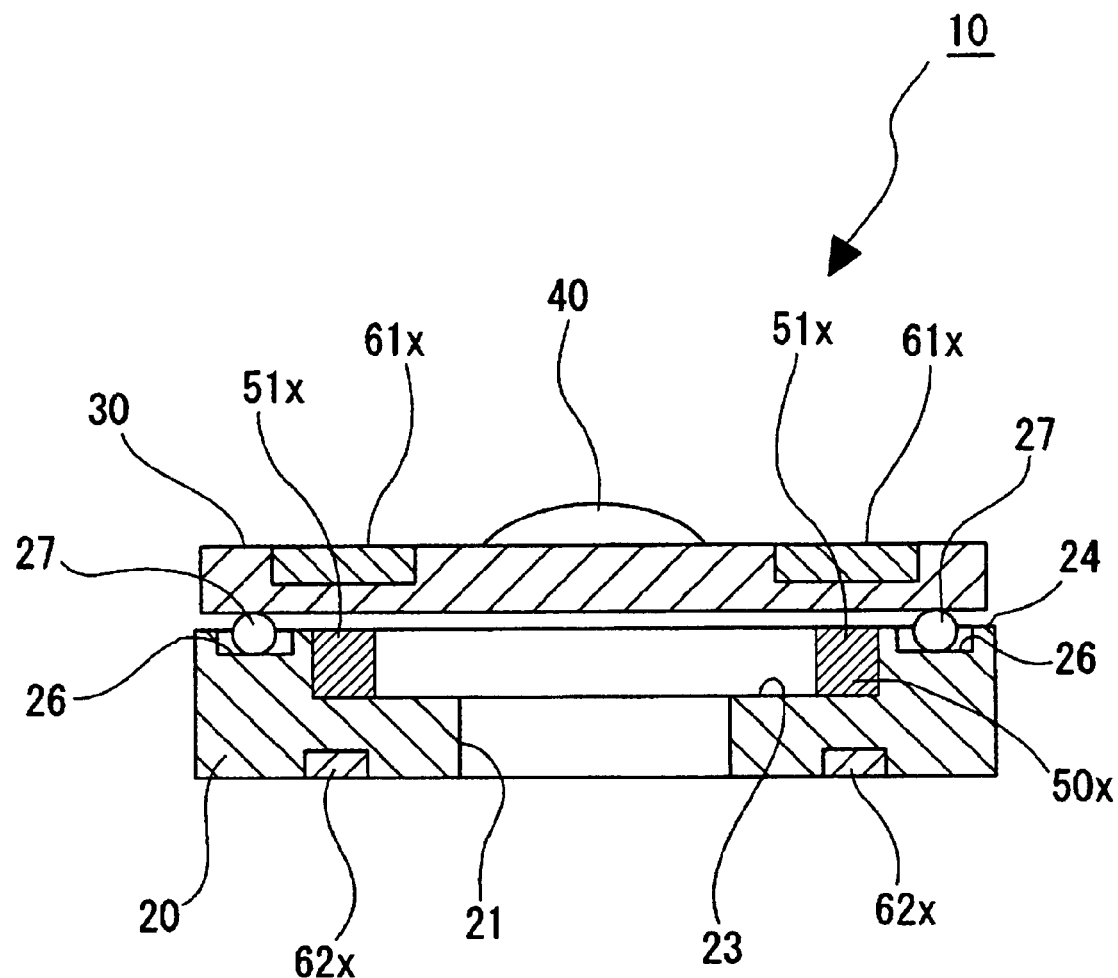
FIG. 3 is an enlarged sectional view of the main portion of the lens driving mechanism.

Hereunder, a lens driving mechanism and an image pickup device in accordance with preferred embodiments of the present invention will be described with reference to the appended relevant drawings.

FIGS. 1 to 6 show a lens driving mechanism in accordance with a first embodiment of the present invention.

A lens driving mechanism 10 includes a movable frame 30 supporting a correcting lens 40 and incorporated in a lens barrel or a stationary frame 20 secured to the lens barrel. Although the stationary frame 20 is a member secured to the lens barrel, the term "lens barrel" is used to include any member secured to the lens barrel like the stationary frame 20.

A large circular light path hole 21 is formed in the center of the stationary frame 20. A large recess 22 is formed substantially over the entire front surface of the stationary frame 20, and has a rectangular shape that approximates to a substantially square shape. A somewhat deep recess 23 having a rectangular shape which is long in the horizontal direction, that is, the X direction is formed in the back side of the recess 22. Shallow recesses 25 and 25 are formed in the central portions of table-shaped portions 24 and 24 formed above and below the recess 23. The shallow recesses 25 and 25 are portions in correspondence with both upper and lower end portions of a rectangular shape which is long in the vertical direction, that is, the Y direction. Shallow small recesses 26 are formed towards the left and right portions in each of the table-shaped portions 24 and 24.

Two coils 50x and 50y are supported by the stationary frame 20. The coil 50x has a substantially rectangular shape which is long-horizontally, and is disposed in the deep recess 23 in the stationary frame 20. The coil 50y has a rectangular shape which is long vertically, with both of its upper and lower ends being disposed so as to be positioned in the shallow recesses 25 and 25 of the stationary frame. In other words, left and right ends 51x and 51x of the coil 50x are positioned at the left and right end portions of the stationary frame 20, while upper and lower end portions 51y and 51y of the coil 50y are positioned at the upper and lower end portions of the stationary frame 20.

Small balls 27 are disposed in the four small recesses 26 in the stationary frame 20 so as to protrude slightly forwardly from the front surfaces of the table-shaped portions 24 and 24 having the recesses 26.

The movable frame 30 has a rectangular shape that approximates to a substantially square shape. Its outer shape is formed one size smaller than the recess 22 in the stationary frame 20. A mounting hole 31 is formed in the central portion of the movable frame 30. The correcting lens 40 is mounted to the mounting hole 31. Shallow recesses 32 and 32 are formed in the left and right end portions of the movable frame, respectively.

Magnetic circuit formation members, that is, magnets and yokes are disposed at the stationary frame 20 and the movable frame 30, respectively. A pair of magnets 61x and 61x are disposed in the recesses 32 and 32 in the movable frame 30, and another pair of magnets 61y and 61y are mounted to the upper and lower end portions of the front side of the movable frame 30. A pair of yokes 62x and 62x are mounted to the left and right end portions of the back side of the stationary frame 20, and another pair of yokes 62y and 62y are mounted to the upper and lower end portions of the back side of the stationary frame 20. The pair of yokes 62x and 62x are positioned at locations opposing the left and right end portions 51x and 51x of the coil 50x, and the other pair of yokes 62y and 62y are positioned at locations opposing the upper and lower end portions 51y and 51y of the coil 50y.

When the movable frame 30 holding the magnets 61x, 61x, 61y, and 61y are positioned in the recess 22 in the stationary frame 20, a magnetic attraction force acting between the magnets 61x, 61x, 61y, and 61y, and the yokes 62x, 62x, 62y, and 62y causes the movable frame 30 to be attracted to the stationary frame 20, so that the front surface of the movable frame 30 is in contact with the small balls 27 held by the stationary frame 20. In other words, the magnetic attraction force acting between the magnets 61x, 61x, 61y, and 61y, and the yokes 62x, 62x, 62y, and 62y and opposing forces generated by contact of the small balls 27 with the movable frame 30 cause the movable frame 30 to be held with respect to an optical axis direction, that is, a Z axis direction. The position of the movable frame 30 is stabilized where magnetic flux densities between the magnets 61x, 61x, 61y, and 61y and the opposing yokes 62x, 62x, 62y, and 62y are largest. Therefore, if the center of the correcting lens 40 is set so as to coincide with the optical axis of a taking lens (not shown) at the location where the magnetic flux densities are largest, the movable frame 30 is held at a location where the center of the correcting lens 40 coincides with the optical axis of the taking lens, that is, is centered while the coils 50x and 50y are not energized. Here, the magnets 61x and 61x and the respective yokes 62x and 62x oppose each other in the forward/backward direction with the left and right end portions 51x and 51x of the coil 50x being disposed therebetween, and the magnets 61y and 61y and the respective yokes 62y and 62y oppose each other in the forward/backward direction with the upper and lower end portions 51y and 51y of the coil 50y being disposed therebetween. The left and right magnets 61x and 61x are disposed in the recesses 32 and 32 so that the distance between the left and right end portions 51x and 51x of the coil 50x is substantially the same as the distance between the upper and lower end portions 51y and 51y of the coil 50y and the distance between the magnets 61y and 61y.

When the coil 50x is energized, a thrust is generated relatively in an X-axis direction between the ends 51x and 51x of the coil 50x and the magnets 61x and 61x and the yokes 62x and 62x. Since the coil 50x is secured, the movable frame 30 supporting the magnets 61x and 61x moves in the X-axis direction. When the coil 50y is energized, a thrust is generated relatively in a Y-axis direction between the ends 51y and 51y of the coil 50y and the magnets 61y and 61y and the yokes 62y and 62y. Since the coil 50y is secured, the movable frame 30 supporting the magnets 61y and 61y move in the Y-axis direction.

Figures 4A, 4B:
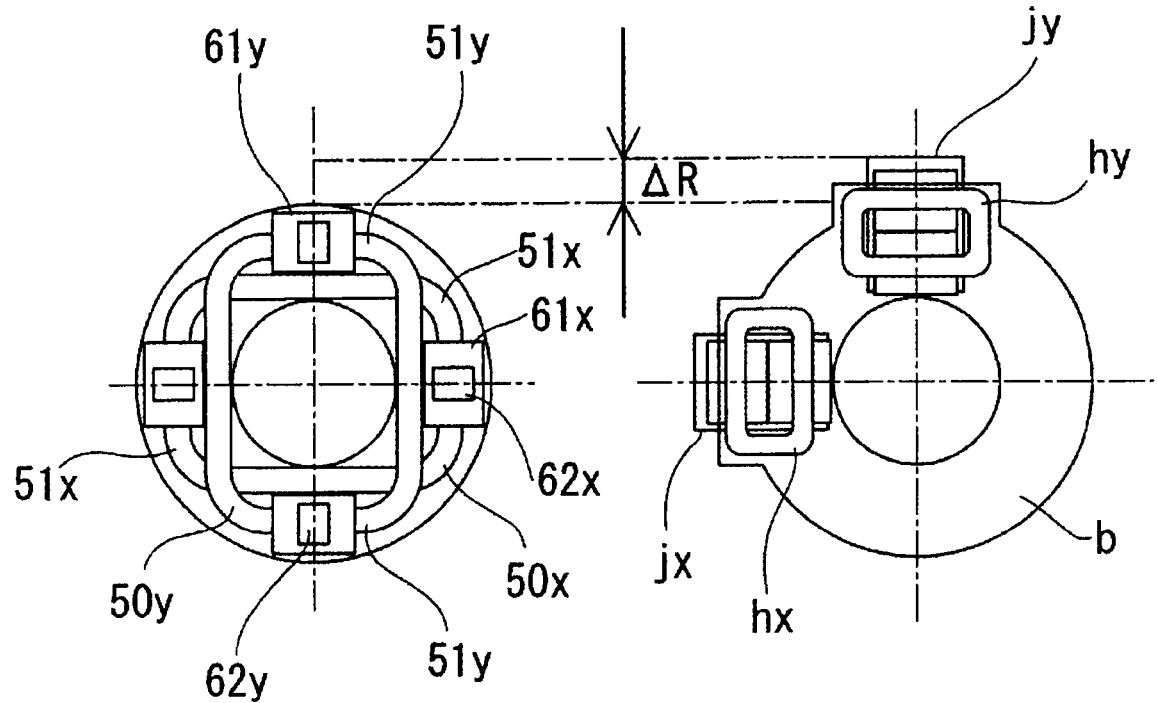
FIGS. 4A and 4B are schematic views comparing the maximum outside diameter according to the embodiment of the present invention (FIG. 4A) and the maximum outside diameter in a related art (FIG. 4B)

In the lens driving mechanism 10, since the ends 51x and 51x of the coil 50x and the ends 51y and 51y of the coil 50y are positioned at the opposing ends of the stationary frame 20, the outward protruding amount is less in this case than when the ends of each coil are disposed at only one of two opposing ends of a movable frame. Therefore, the magnets 61x and 61x and the magnets 61y and 61y disposed at the movable frame 30 so as to oppose the ends 51x and 51x of the coil 50x and the ends 51y and 51y of the coil 50y, respectively, can be small, so that the maximum outside diameter of the movable frame 30 can be small. The lens driving mechanism 10 shown schematically in FIG. 4A is compared with the lens driving mechanism (previously shown in FIG. 15) shown schematically in FIG. 4B. As can be seen from FIGS. 4A and 4B, the area of each magnet 61 which is disposed only at its associated one end of the coil 50 is half the area of magnets j disposed at both ends of each coil h. Therefore, the maximum outside diameter of the movable frame 30 is less than that of the movable frame shown in FIG. 15 by ΔR.

Figure 5B:
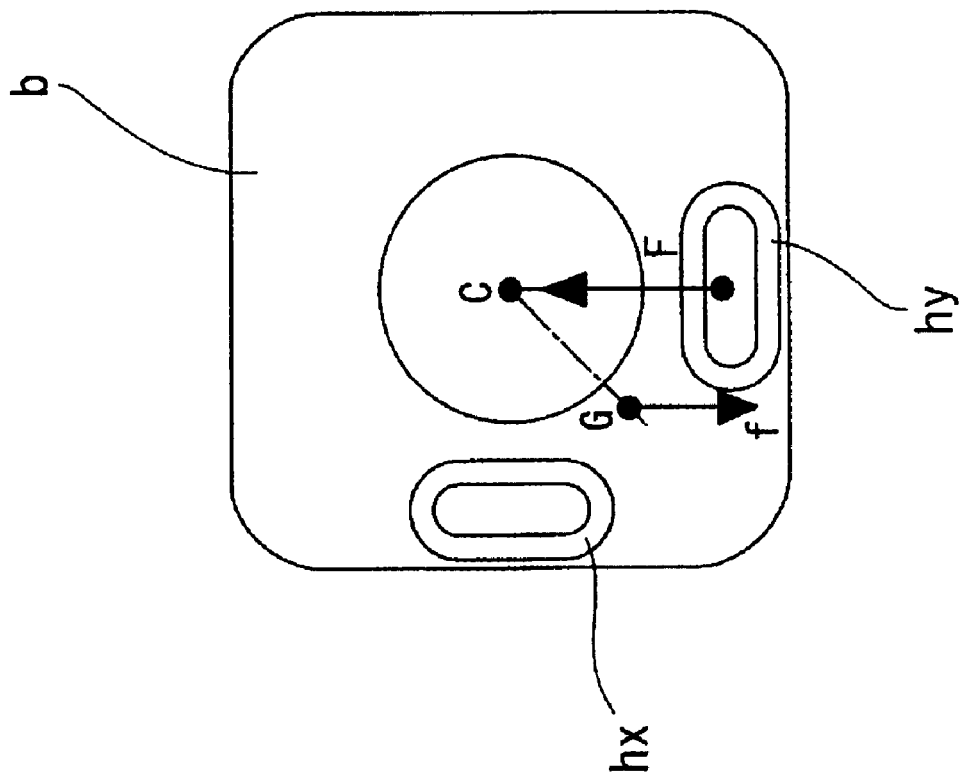
FIG. 5B is a schematic view illustrating a mechanism which produces rolling in the related art.
Figure 5A:
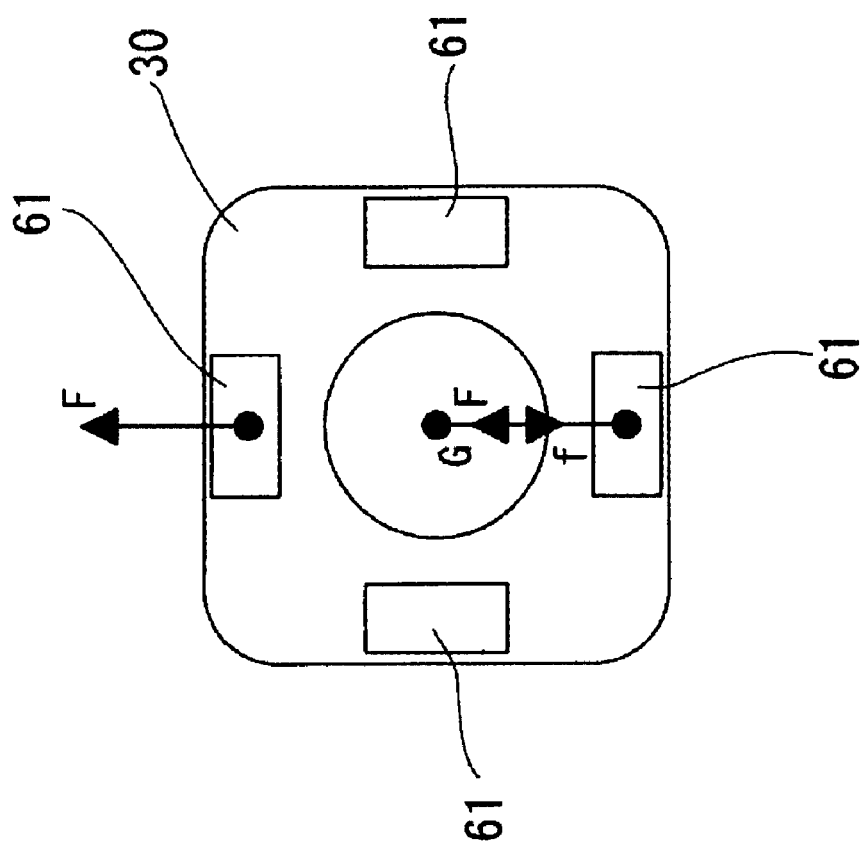
FIG. 5A is a schematic view illustrating a mechanism which produces rolling in the embodiment of the present invention.

In the lens driving mechanism 10, the movable frame 30 does not roll when the coils 50 are energized. In the related lens driving mechanism, as shown in FIG. 5B, since the coils hx and hy are each disposed at one side of the movable frame b, a center-of-gravity position G of the entire movable unit including the movable frame b and the coils hX and hY is displaced from the center of the movable frame b. Therefore, when, for example, a thrust F is generated in the coil hY in the direction of a thick arrow shown in FIG. 5B, an inertial force f acts at the center of gravity G, causing a moment to be generated. Consequently, rolling occurs around the optical axis. In contrast, in the lens driving mechanism 10 according to the embodiment of the present invention, as shown in FIG. 5A, since the four magnets 61 are symmetrically disposed vertically and horizontally with respect to the optical axis as the center at the movable frame 30 in a plane perpendicular to the optical axis, a center of gravity G of the entire moving unit including the movable frame 30 and the magnets 61 is positioned near a center C of the movable frame 30 that substantially coincides with the optical axis. Therefore, the moment generated is small, thereby making it difficult for rolling to occur.

Figure 6:
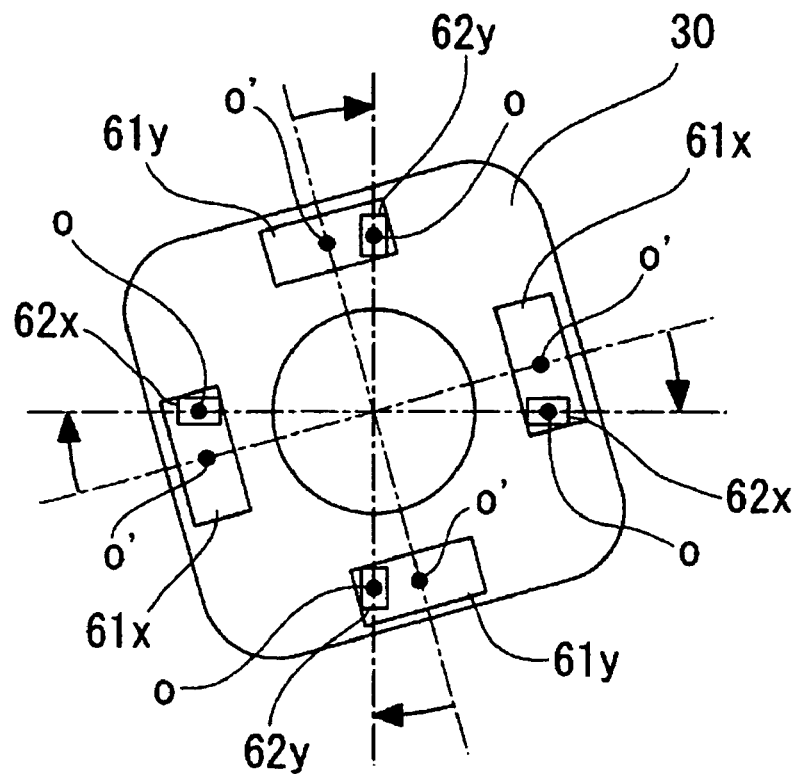
FIG. 6 is a schematic view illustrating the principle of correcting rolling.

As shown in FIG. 6, even if the movable frame 30 rolls around the optical axis with respect to the stationary frame 20, a moment acts in the directions of arrows and around the optical axis by magnetic attraction forces between center positions O' of the magnets 61 and center positions O of the opposing yokes 62 so that the center positions O' and the respective center positions O are separated by minimum distances. Therefore, the movable frame 30 tries to correct its posture caused by rolling, and thus exhibits a rolling prevention effect.

Although, in the embodiment, the magnets 61 are disposed at the movable frame 30, and the yokes 62 are disposed at the stationary frame 20, the magnets 61 may be disposed at the stationary frame 20, and the yokes 62 may be disposed at the movable frame 30.

Figure 7:
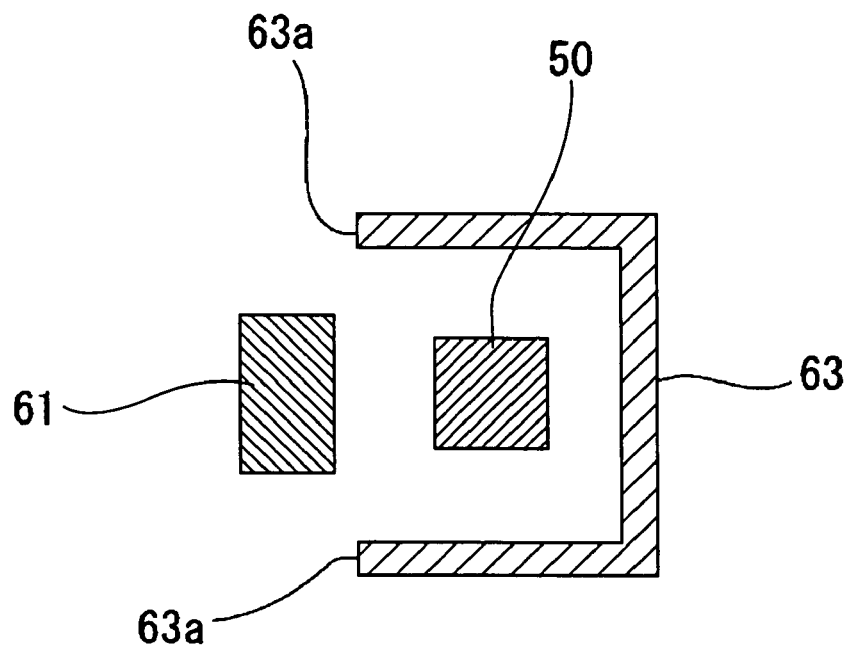
FIG. 7 is an enlarged sectional view of the main portion of a modification of a yoke.
Figure 8:
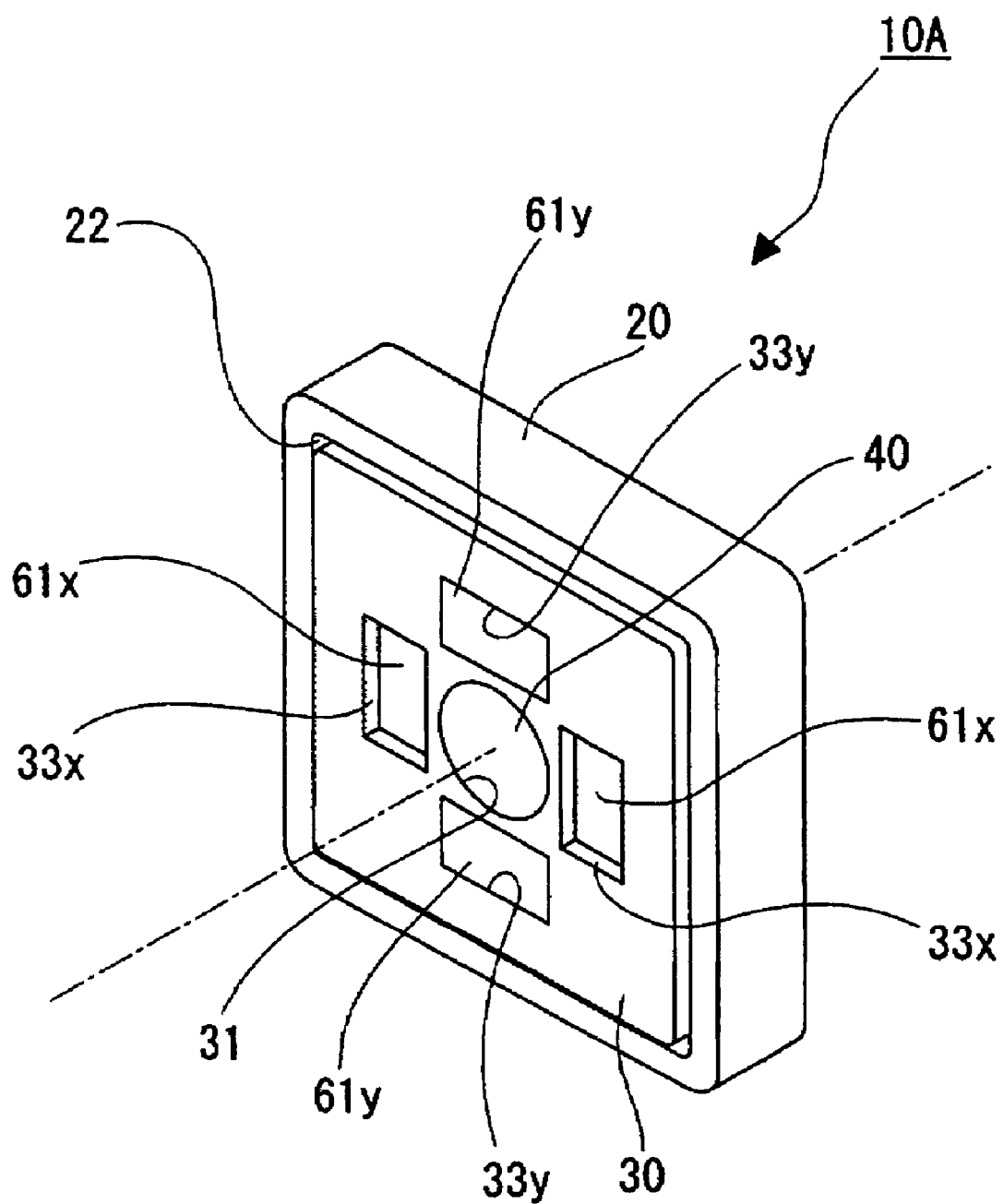
FIG. 8 shows, along with FIGS. 9 to 12, a lens driving mechanism according to a second embodiment of the present invention, and is a perspective view of the entire lens driving mechanism.
Figure 9:
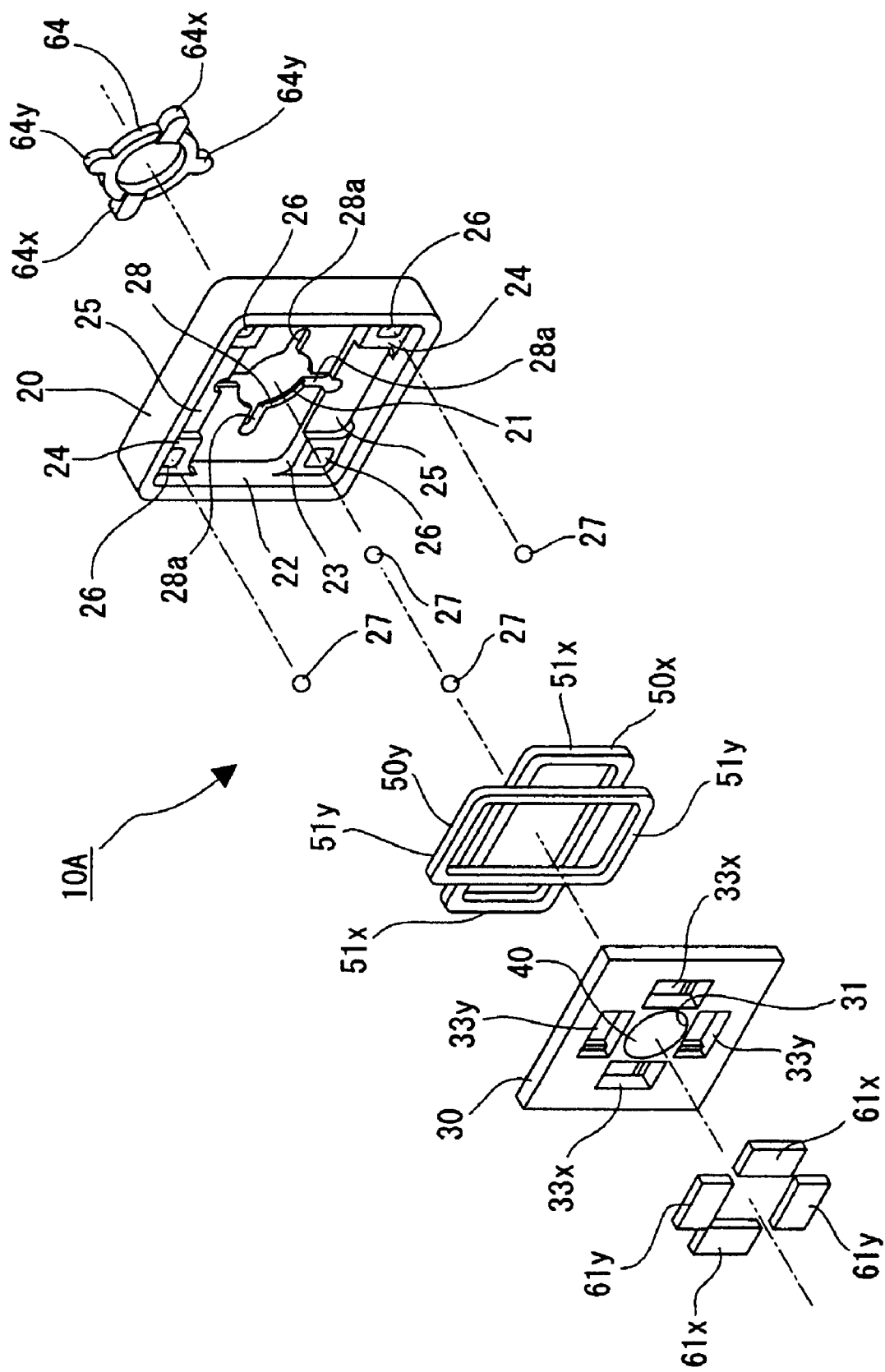
FIG. 9 is an exploded perspective view of the entire lens driving mechanism.

Although, in the embodiment, each yoke 62 is a plate, a U-shaped yoke 63 may be used as shown in FIG. 7. In this case, the ends 51 of the coil 50 is disposed within the yoke 63, with both ends 63a and 63a of the yoke 63 being disposed close to the magnet 61. This reduces flux leakage and increases magnetic efficiency, so that the aforementioned centering effect and rolling prevention effect can be increased.

A lens driving mechanism 10A according to a second embodiment of the present invention is shown in FIGS. 8 to 12. The greatest difference between the lens driving mechanism 10A according to the second embodiment and the lens driving mechanism 10 according to the first embodiment is in the form of the yokes, so that this difference will be described in detail. Parts in the second embodiment corresponding to those in the first embodiment are given the same reference numerals as those in the first embodiment, and will not be described below.

A shallow substantially circular recess 28 is formed in the back portion of a substantially rectangular recess 23 that is long in the horizontal direction of a stationary frame 20. Outwardly protruding portions 28a are formed at four locations, the upper, lower, left, and right portions of the recess 28, respectively.

Substantially rectangular recesses 33x and 33y are formed in four locations, the upper, lower, left, and right portions of a movable frame 30, respectively, so as to surround a mounting hole 31 in the front surface of the movable frame 30. The two left and right recesses 33x and 33x are deeper than the two upper and lower recesses 33y and 33y. Magnets 61x and 61x are disposed in the recesses 33x and 33x, and magnets 61y and 61y are disposed in the recesses 33y and 33y.

A yoke 64 is a ring yoke. Protrusions 64y and 64y and protrusions 64x and 64x are integrally formed so as to protrude outward from four locations, the upper and lower portions and the left and right portions of the peripheral edge of the ring yoke, respectively. The ring yoke 64 is positioned in the recess 28 in the stationary frame 20. That is, the protrusions 64 of the ring yoke 64 are positioned in the protruding portions 28a of the recess 28.

When the movable frame 30 holding the magnets 61x, 61x, 61y, and 61y are positioned in the recess 22 in the stationary frame 20, a magnetic attraction force acting between the magnets 61x, 61x, 61y, and 61y, and the yoke 64 causes the movable frame 30 to be attracted to the stationary frame 20, so that the front surface of the movable frame 30 is in contact with small balls 27 held by the stationary frame 20. In other words, the magnetic attraction force acting between the magnets 61x, 61x, 61y, and 61y, and the yoke 64 and opposing forces generated by contact of the small balls 27 with the movable frame 30 cause the movable frame 30 to be held with respect to an optical axis direction, that is, a Z axis direction. The position of the movable frame 30 is stabilized where magnetic flux densities between the magnets 61x, 61x, 61y, and 61y, and the yoke 64 are largest. Therefore, if the center of the correcting lens 40 is set so as to coincide with the optical axis of a taking lens (not shown) at the location where the magnetic flux densities are largest, the movable frame 30 is held at a location where the center of the correcting lens 40 coincides with the optical axis of the taking lens, that is, is centered while the coils 50x and 50y are not energized. Here, the magnets 61x and 61x and the protrusions 64x and 64x of the yoke 64 oppose each other in the forward/backward direction with left and right end portions 51x and 51x of the coil 50x being disposed therebetween, and the magnets 61y and 61y and the protrusions 64y and 64y of the yoke 64 oppose each other in the forward/backward direction with upper and lower end portions 51y and 51y of the coil 50y being disposed therebetween. The left and right magnets 61x and 61x are disposed in the deep recesses 33x and 33x so that the distance between the left and right end portions 51x and 51x of the coil 50x is substantially the same as the distance between the upper and lower end portions 51y and 51y of the coil 50y and the distance between the magnets 61y and 61y.

Figure 10B:
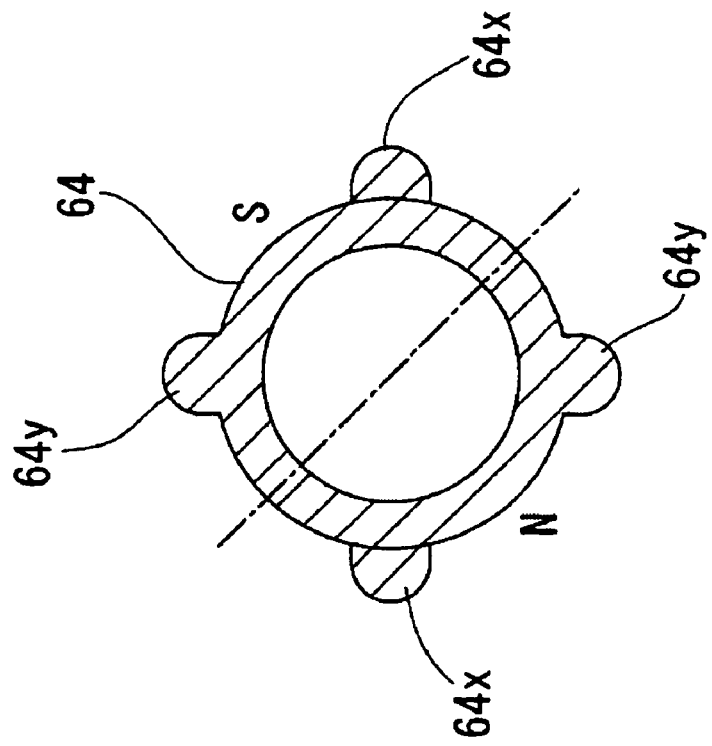
FIGS. 10A and 10B illustrate the structure of a magnetic circuit.
Figure 10A:
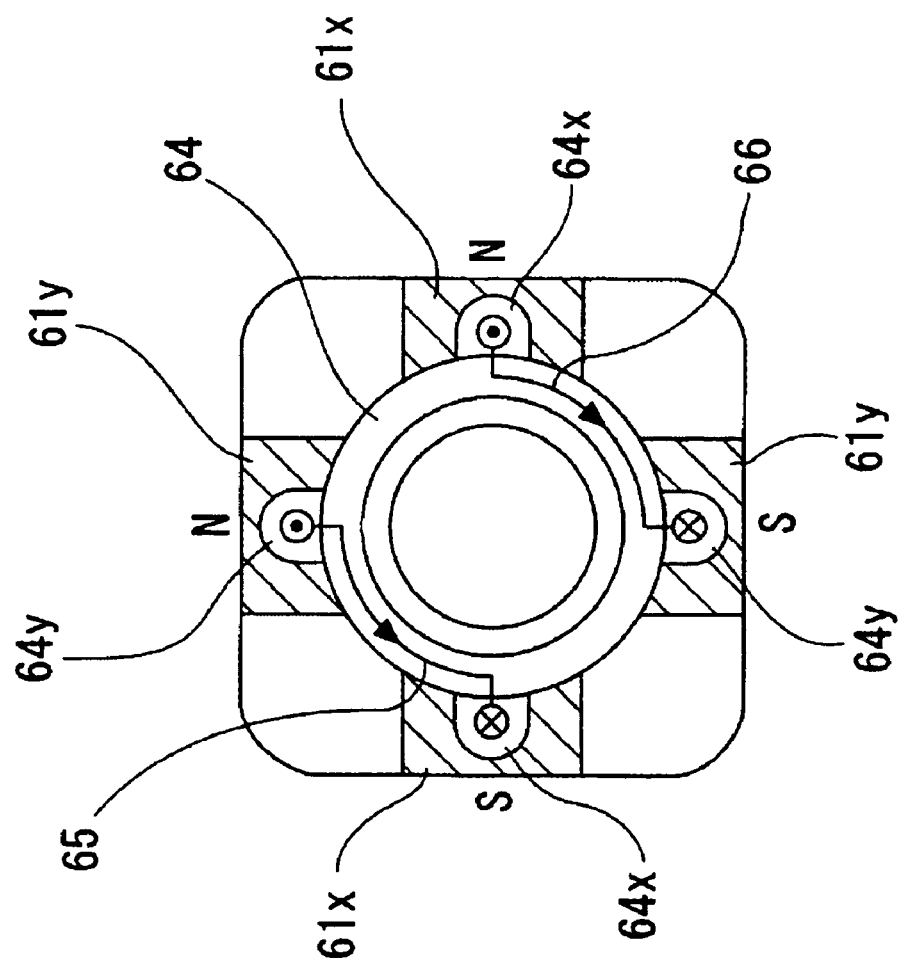
Figure 11:
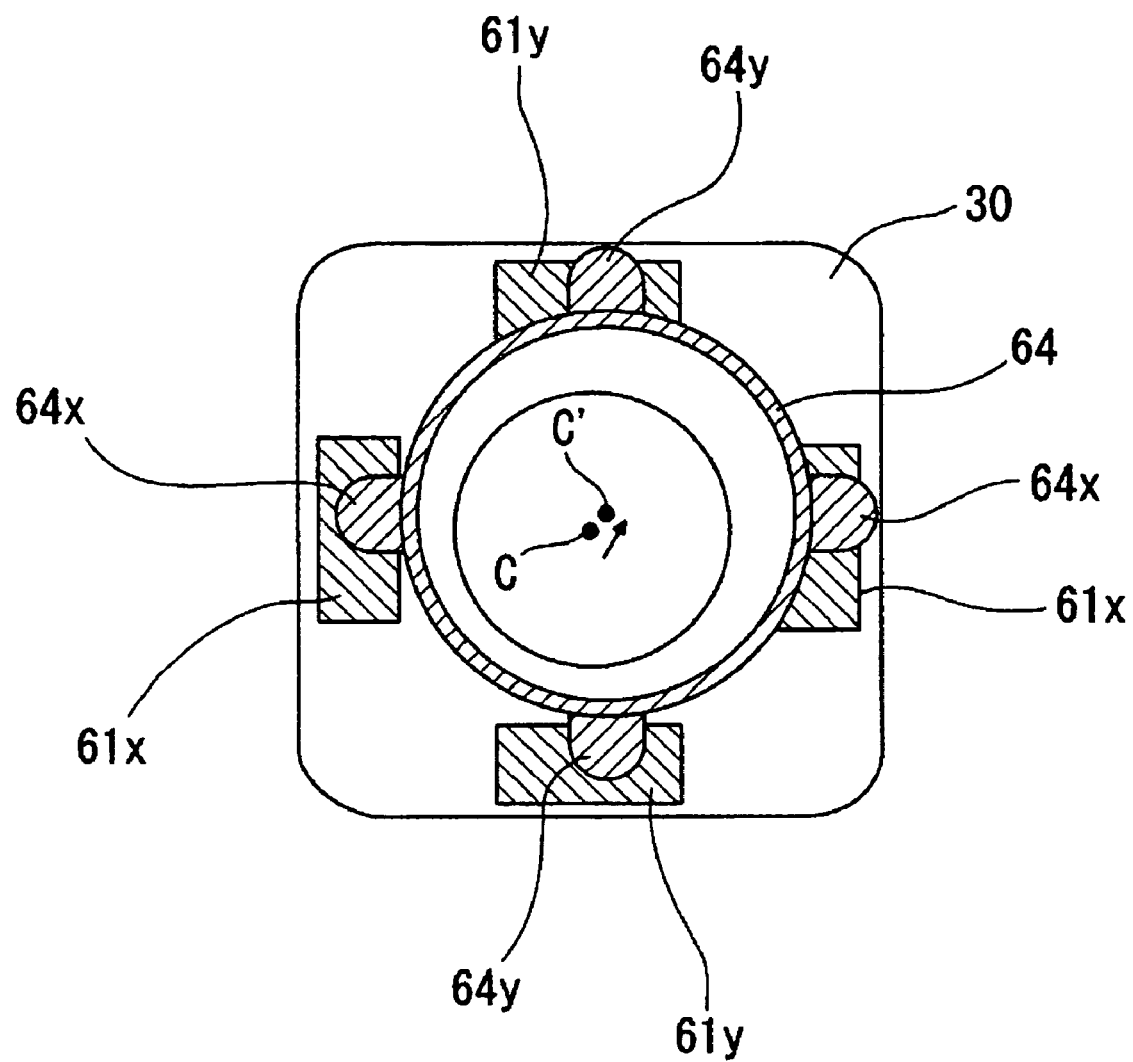
FIG. 11 is a schematic view illustrating the principle of centering.

The foregoing description will be simplified. As shown in FIG. 10A, when the directions of the magnetic poles of the magnets 61x and 61y are set, the magnetic flux from the upper magnet 61y passes through the ring yoke 64 as indicated by arrow 65 and travels towards the left magnet 61x, whereas the magnetic flux from the right magnet 61x passes through the ring yoke 64 as indicated by arrow 66 and travels towards the lower magnet 61y, so that, as shown in FIG. 10b, the ring yoke 64 becomes polarized, as a result of which the magnetic fluxes concentrate at the protrusions 64x, 64x, 64y, and 64y. Therefore, when the movable frame 30 and the ring yoke 64 are disposed as shown in FIG. 10A, a magnetic attraction force acts upon the movable frame 30 so that a center C of the movable frame 30 coincides with a center C' of the ring yoke 64. Therefore, as shown in FIG. 11, when the center C of the movable frame 30 is displaced from the center C' of the ring yoke 64 perpendicularly to the optical axis, a magnetic attraction force acts upon the movable frame 30 in a direction in which the center C of the movable frame 30 tries to coincide with the center C' of the ring yoke 64. In other words, the movable frame 30 possesses a centering effect.

In the lens driving mechanism 10A according to the second embodiment, since the ends 51x and 51x of the coil 50x and the ends 51y and 51y of the coil 50y are positioned at the opposing ends of the stationary frame 20, the outward protruding amount is less in this case than when the ends of each coil are disposed at only one of two opposing ends of a movable frame. Therefore, the magnets 61x and 61x and the magnets 61y and 61y disposed at the movable frame 30 so as to oppose the ends 51x and 51x of the coil 50x and the ends 51y and 51y of the coil 50y, respectively, can be small, so that the maximum outside diameter of the movable frame 30 can be small.

Figure 12:
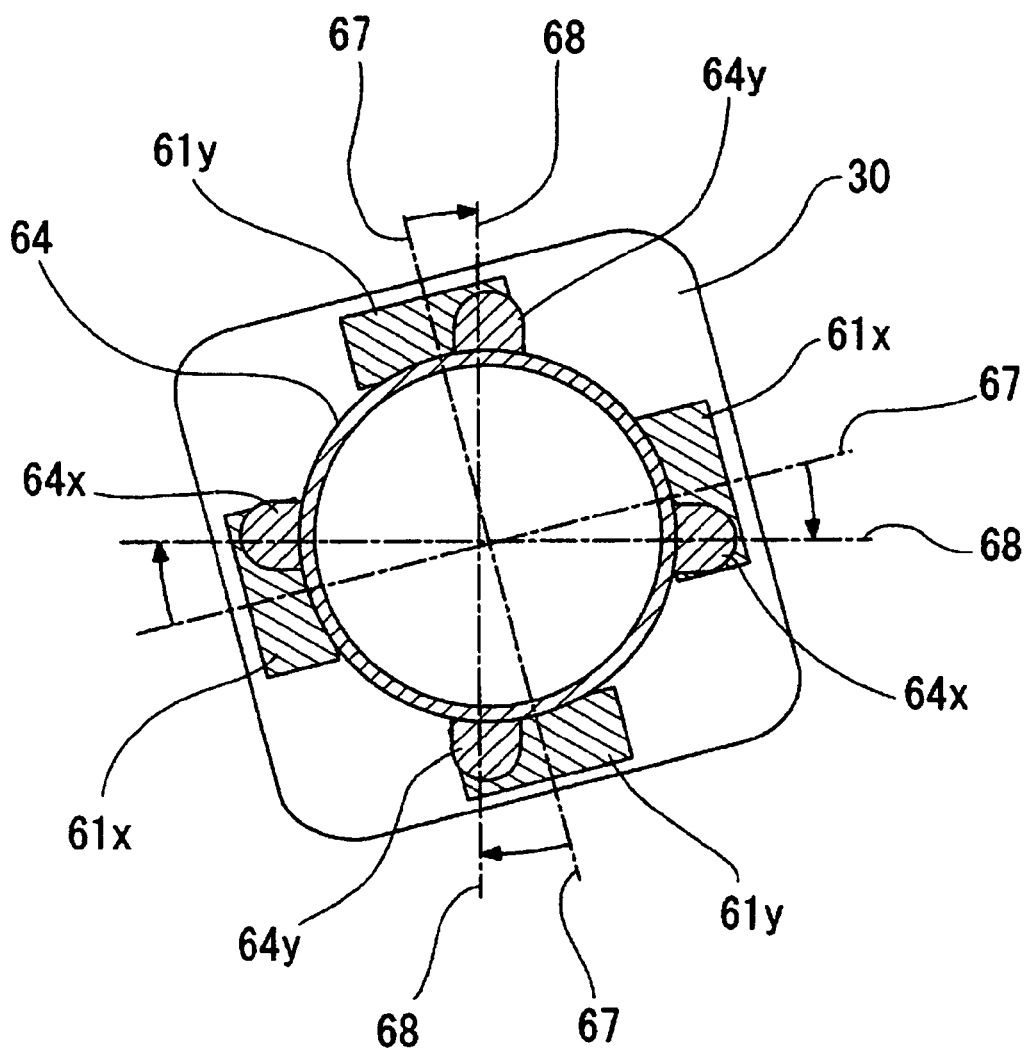
FIG. 12 is a schematic view illustrating the principle of correcting rolling.

In the lens driving mechanism 10A according to the second embodiment, since the four magnets 61x, 61x, 61y, and 61y are symmetrically disposed vertically and horizontally with respect to the optical axis as the center at the movable frame 30 in a plane perpendicular to the optical axis, a center of gravity G of the entire moving unit including the movable frame 30 and the magnets 61x and 61y is positioned near a center C of the movable frame 30 that substantially coincides with the optical axis. Therefore, the moment generated is small, thereby making it difficult for rolling to occur. When the ring yoke 64 is disposed as shown in FIG. 10A, the protrusions 64x, 64x, 64y, and 64y are polarized as shown in FIG. 10B. Therefore, as shown in FIG. 12, when the movable frame 30 rolls, a moment which makes parallel a line 67 connecting the magnets 61x and 61x to a line 68 connecting the protrusions 64x and 64x of the ring yoke 64 is generated at the movable frame 30, so that the rolling of the movable frame 30 is corrected.

Although, in the embodiment, the magnets 61x and magnets 61y are disposed at the movable frame 30, and the yoke 64 is disposed at the stationary frame 20, the magnets 61x and magnets 61y may be disposed at the stationary frame 20, and the yoke 64 may be disposed at the movable frame 30.

Although, in the embodiment, the ring yoke 64 has an annular shape, it may have a substantially annular shape or a polygonal (such as an octagonal) annular shape.

The protrusions 64x, 64x, 64y, and 64y of the ring yoke 64 are disposed for providing a higher centering effect and a higher rolling prevention effect by concentrating the magnetic flux more at the portions of the ring yoke 64 opposing the magnets 61x and magnets 61y than at any other portions of the ring yoke 64. Therefore, instead of forming the protrusions 64x, 64x, 64y, and 64y, portions of the ring yoke 64 that do not oppose the magnets 61 may be cut out in order to concentrate the magnetic flux at the portions of the ring yoke 64 opposing the magnets 61x and magnets 61y.

Figure 15:
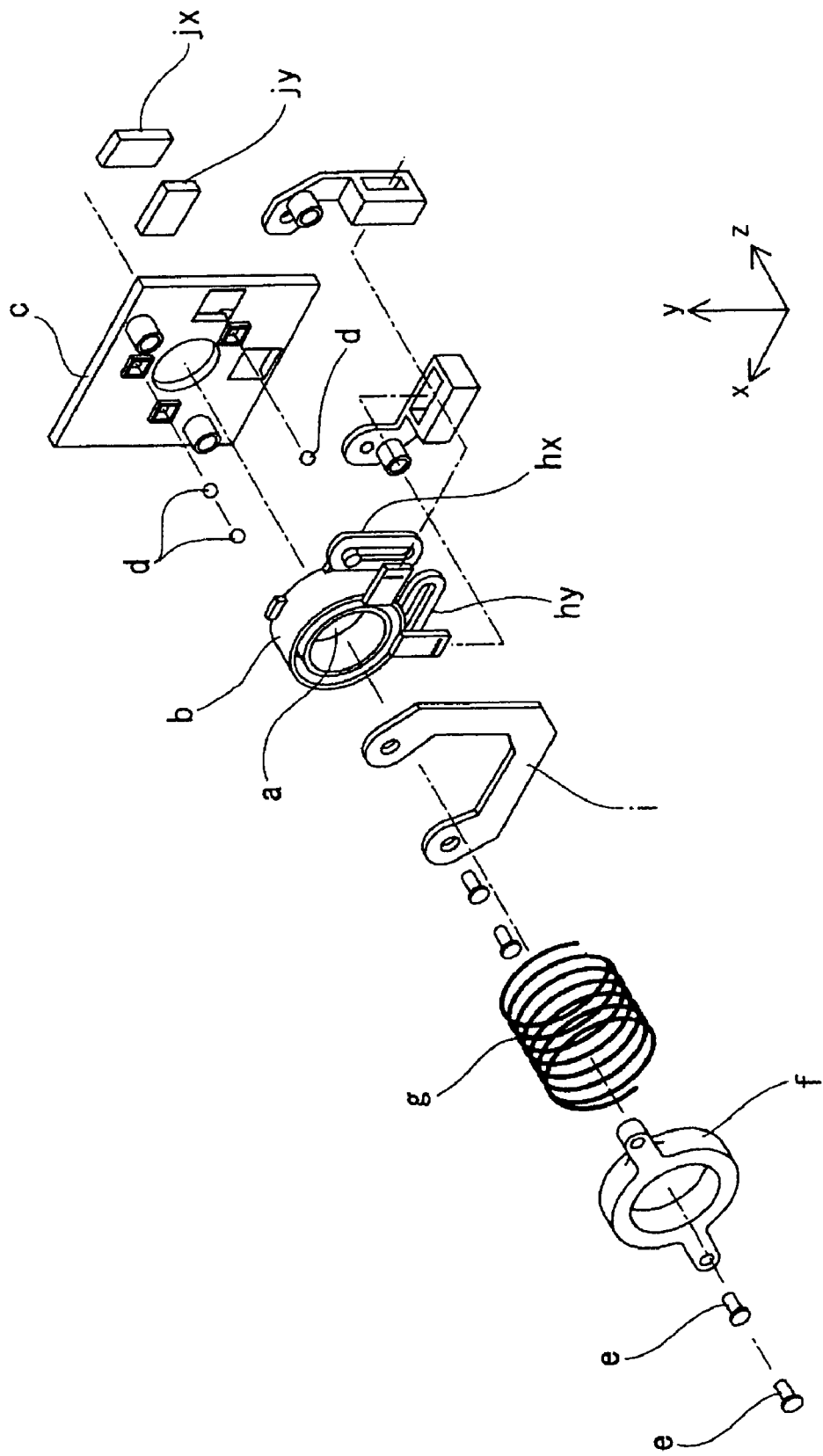
FIG. 15 is an exploded schematic perspective view of another related lens driving mechanism.

In each of the above-described embodiments, the movable frame 30 is supported in the optical direction by magnetic attraction force acting between the magnets and the respective yokes and opposing force caused by contact of the movable frame 30 with the small balls 27. Therefore, as in the related lens drive mechanism shown in FIG. 15, the movable member is a single member and has a simple structure. In addition, the coil spring g which is required in the lens driving mechanism shown in FIG. 15 is not required, so that the structure according to each of the above-described embodiments is further simplified.

In each of the above-described embodiments, the coils 50 may be what are called print coils formed by a printing technology. Therefore, the structure in each of the embodiments may be further reduced in size, particularly in the optical axis direction.

Figure 13:
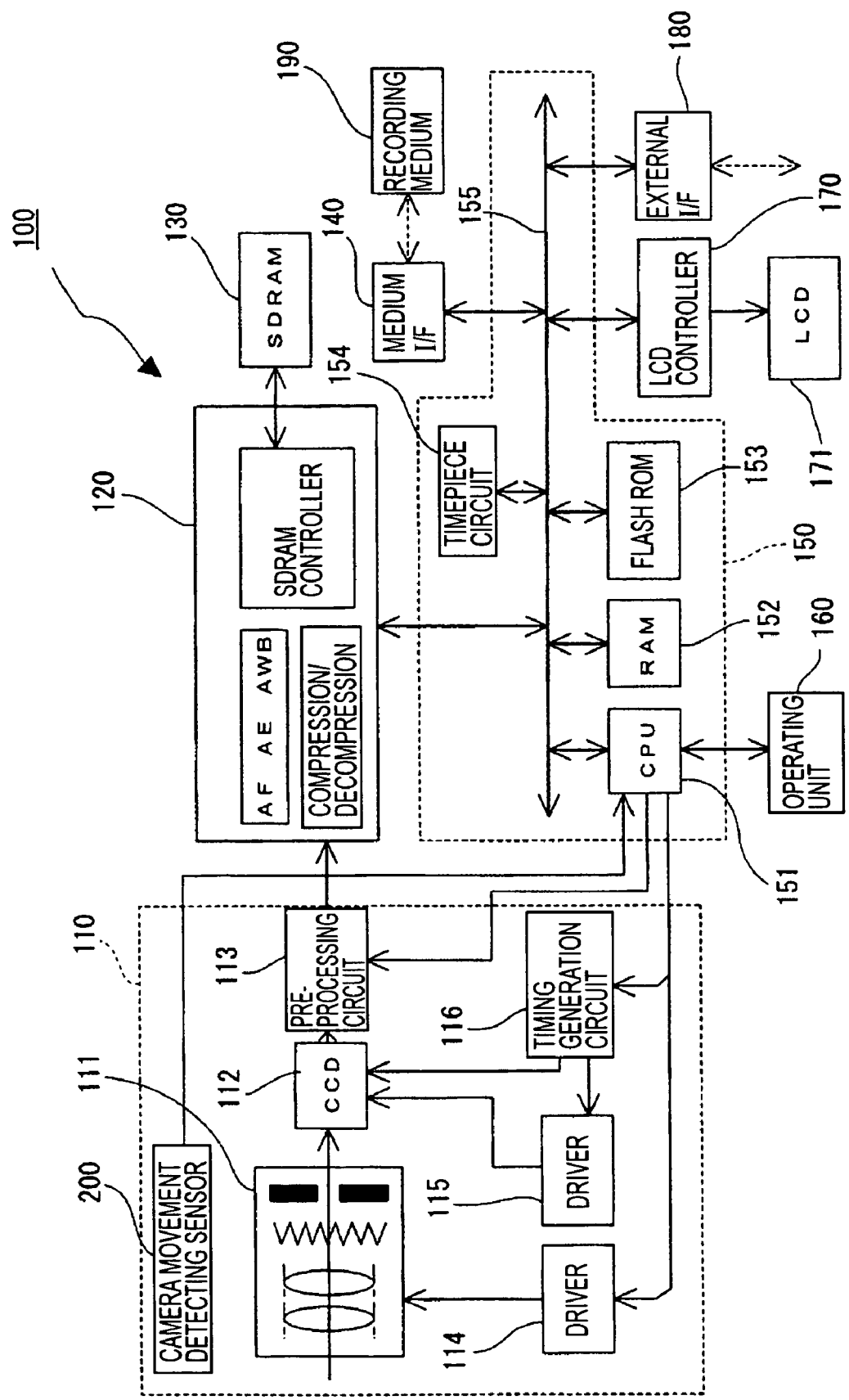
FIG. 13 is a block diagram of an image pickup device according to an embodiment of the present invention.
Figure 14:
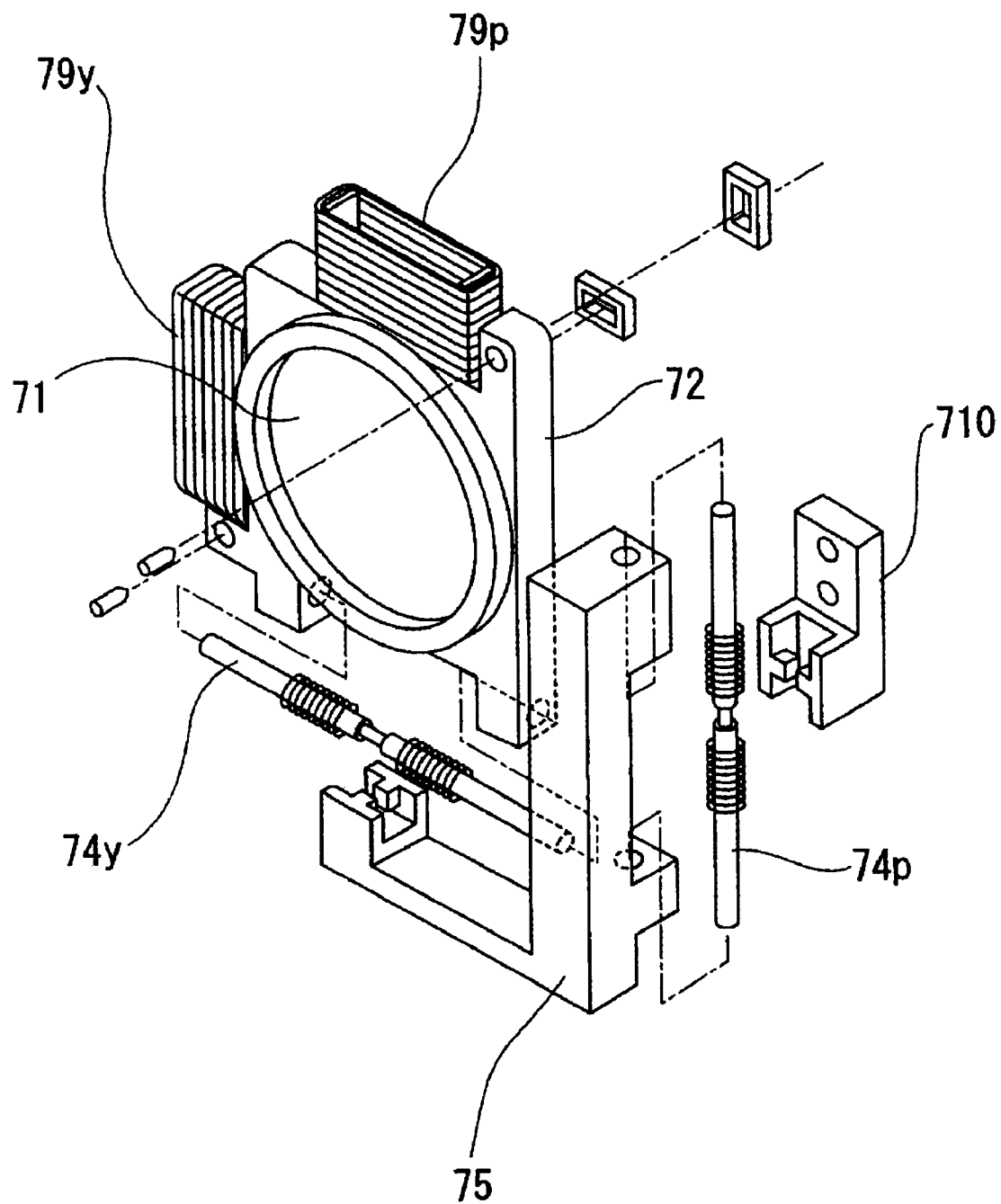
FIG. 14 is a schematic perspective view of the main portion of a related lens driving mechanism.

FIG. 13 is a block diagram of an image pickup device according to an embodiment of the present invention.

An image pickup device 100 according to this embodiment broadly includes a camera 110, a camera digital signal processor (camera DSP) 120, a synchronous dynamic random access memory (SDRAM) 130, a medium interface (hereunder referred to as "medium I/F") 140, a controlling unit 150, an operating unit 160, a liquid crystal display (LCD) controller 170, a liquid crystal display (LCD) 171, and an external interface (hereunder referred to as "external I/F") 180. A recording medium 190 is removable from the image pickup device 100.

Various types of recording media may be used for the recording medium 190. They include what is called a memory card using a semiconductor memory, an optical recording medium such as a recordable compact disc (CD) and a recordable digital versatile disk (DVD), and a magnetic recording medium such as a magnetic disc. In this embodiment, the recording medium 190 will be described as being a memory card.

The camera 110 includes an optical block 111, a charge coupled device (CCD) 112, a pre-processing circuit 113, an optical block driver 114, a CCD driver 115, a timing generating circuit 116, and a camera movement detecting sensor 200. Here, the optical block 111 includes, for example, a lens, a focusing mechanism, a shutter mechanism, an iris mechanism, and a camera movement correcting mechanism using the aforementioned lens driving mechanism 10 or 10A.

The controlling unit 150 is a microcomputer in which a central processing unit (CPU) 151, a random access memory (RAM) 152, a flash read only memory (flash ROM) 153, and a timepiece circuit 154 are connected via a system bus 155. The controlling unit 150 can control each part of the image pickup device according to the embodiment.

Here, RAM 152 is primarily used as a working area, such as an area where a processing result is temporarily stored during a processing operation. The flash ROM 153 stores, for example, data required for a processing operation and various programs executed at the CPU 151. The timepiece circuit 154 can provide, for example, the current date, the current day of the week, the current time, and the date of shooting.

When shooting an image, in accordance with the controlling operation by the controlling unit 150, the optical block driver 114 forms a drive signal for operating the optical block 111. The drive signal is supplied to the optical block 111 in order to operate the optical block 111. The focusing mechanism, the shutter mechanism, the iris mechanism and the camera movement correcting mechanism of the optical block 111 are controlled in accordance with the drive signal from the optical block driver 114 in order to receive a subject image. The subject image is provided to the CCD 112. In the controlling operation on the camera movement correcting mechanism, information regarding the camera movement amount detected by the detecting sensor 200, including, for example, an X-axis direction accelerometer and a Y-axis direction accelerometer, is output to the controlling unit 150. On the basis of the camera movement amount, the controlling unit 150 calculates the amount of shift in the position of the correcting lens 40. Then, the controlling unit 150 controls the driving of a correcting lens position controlling section (not shown) in the optical block driver 114 so as to shift the position of the correcting lens 40 on the basis of the calculated amount of shift. For example, when the position of the correcting lens 40 is controlled with either one of the lens driving mechanisms 10 and 10A according to the above-described embodiments, the correcting lens position controlling section shifts the position of the correcting lens 40 by energizing the coils 50x and 50y of the lens driving mechanism 10 or the lens driving mechanism 10A on the basis of a control signal from the controlling unit 150.

The CCD 112 performs photo-electric conversion on the image from the optical block 111 and outputs the converted image. The CCD 112 operates in accordance with a drive signal from the CCD driver 115, receives the subject image from the optical block 111, and supplies to the pre-processing circuit 113 the received subject image (image information) as an electrical signal on the basis of a timing signal from the timing generating circuit 116 controlled by the controlling unit 150.

As mentioned above, the timing generating circuit 116 forms a timing signal (which provides a predetermined timing) in accordance with the controlling by the controlling unit 150. On the basis of the timing signal from the timing generating circuit 116, the CCD driver 115 forms the drive signal which is supplied to the CCD 112.

The pre-processing circuit 113 maintains a proper S/N ratio by performing correlated double sampling (CDS) in accordance with the image information of the electrical signal supplied to the pre-processing circuit 113. The pre-processing circuit 113 also controls gain by performing automatic gain control (AGC), and forms image data of a digital signal by performing analog/digital (A/D) conversion.

The image data of the digital signal from the pre-processing circuit 113 is supplied to the camera DSP 120. The camera DSP 120 performs camera signal processing operations, such as auto focus (AF), auto exposure (AE), and auto white balance (AWB) on the supplied image data. The image data variously adjusted in this manner is compressed by a predetermined compression method, and the compressed image data is supplied to the recording medium 190 loaded in the image pickup device according to the embodiment via the system bus 155 and the medium I/F 140 in order to be recorded as a file on the recording medium 190.

The image data to be read recorded on the recording medium 190 is read from the recording medium 190 via the medium I/F 140 in accordance with a user's input accepted via the operating unit 160 including, for example, a touch panel and a control key. Then, the read image data is supplied to the camera DSP 120.

The camera DSP 120 decompresses the compressed image data read from the recording medium 190 and supplied via the medium I/F 140. Then, the decompressed image data is supplied to the LCD controller 170 via the system bus 155. The LCD controller 170 forms an image signal to be supplied the LCD 171 on the basis of the supplied image data, and supplies the image signal to the LCD 171. This causes an image formed in accordance with the image data recorded on the recording medium 190 to be displayed on a display screen of the LCD 171.

The form of the display of the image is in accordance with a display processing program recorded in ROM. The display processing program is a program for indicating by what mechanism a file system (described later) is recorded and how an image is reproduced.

The image pickup device 100 according to the embodiment includes the external I/F 180. The image pickup device 100 may be connected to, for example, an external personal computer via the external I/F 180 in order to receive image data from the personal computer and record the supplied image data onto the recording medium 190 loaded in the image pickup device 100 and in order to supply the image data recorded on the recording medium 190 loaded in the image pickup device 100 to the external personal computer.

Connecting the image pickup device 100 to a network, such as the internet, by connecting a communication module to the external I/F 180 makes it possible to obtain various image data and other types of data through the network in order to record such data on the recording medium 190 loaded in the image pickup device 100 and to transmit the data recorded on the recording medium 190 loaded in the image pickup device 100 to a target device via the network.

Obviously, data, such as image data, obtained via the external personal computer or network and recorded on the recording medium 190 may be read out and reproduced at the image pickup device 100 and displayed on the LCD 171 for use by a user.

The external I/F 180 may be disposed as a wired interface, such as Institute of Electrical and Electronics Engineers (IEEE) 1394 or a universal serial bus (USB), or as a wireless interface based on light or electrical waves.

Accordingly, the image pickup device 100 can shoot a subject image and record the subject image on the recording medium 190, and can read out the image data recorded on the recording medium 190, reproduce the read image data, and use the reproduced image data. In addition, through an external personal computer or a network, the image pickup device 100 can receive image data and record the image data on the recording medium 190 loaded in the image pickup device 100 or read out and reproduce the recorded image data.

The form and structure of each part in each of the embodiments are merely examples in embodying the present invention when carrying out the present invention. Therefore, these are not to be construed as limiting the technical scope of the present invention.

What is claimed is:

1. A lens driving mechanism configured to eccentrically drive a correcting lens including at least one lens or lens subunit, in a lens system constituting a taking lens unit in a plane perpendicular to an optical axis direction, the lens driving mechanism comprising:

a movable frame configured to hold the correcting lens;

a first and second electrical coil which are substantially rectangular and are fixedly disposed at a lens barrel where the taking lens unit is disposed, the first and second coils are disposed completely surrounding the optical axis of the correcting lens when viewed in the optical axis direction of the taking lens unit, long axis directions of said first and second electrical coils are perpendicular to each other, and the two electrical coils overlap each other when viewed in the optical axis direction, said first electrical coil containing two short sides and two long sides, the length of the short side being smaller than the length of the long side, and said second electrical coil containing two short sides and two long sides, the length of the short side of the second coil being smaller than the length of the long side of the electrical coil, wherein when viewed in the optical axis direction the two short sides of the first electrical coil extend outside of both of the long sides of the second coil, and the two short sides of the second coil extend outside of both of the long sides of the first coil; and magnetic circuit formation members configured to generate a magnetic field that crosses the coils, the magnetic circuit formation members include at least two magnets and yokes disposed at each of the two coils for generating movement forces in different directions perpendicular to the optical axis, the yokes opposing the respective magnets, either the magnets or the yokes being held by the movable frame, the other of the magnets and yokes being secured to the lens barrel.

2. The lens driving mechanism according to claim 1, wherein the at least two magnets disposed at each of the first and second coil includes two magnets, the two magnets at one of the coils oppose each other at both ends of the coil in its long axis direction, and the two magnets at the other coil oppose each other at both ends of the other coil in its long axis direction.

3. The lens driving mechanism according to claim 1, wherein at least three small balls are interposed between the movable frame and the lens barrel, and rotation of the small balls move the movable frame with respect to the lens barrel.

4. The lens driving mechanism according to claim 2, wherein at least three small balls are interposed between the movable frame and the lens barrel, and rotation of the small balls move the movable frame with respect to the lens barrel.

5. The lens driving mechanism according to claim 1, wherein the yokes are substantially annular.

6. The lens driving mechanism according to claim 2, wherein the yokes are substantially annular.

7. The lens driving mechanism according to claim 6, wherein a radial width of a portion of each yoke opposing its associated magnet or a radial width of the portion of each yoke opposing its associated magnet and a portion near the portion of each yoke opposing its associated magnet is larger than a radial width of any other portion of each yoke so that a magnetic flux density at the portion of each yoke opposing its associated magnet is greater than a magnetic flux density at the any other portion of each yoke.

8. The lens driving mechanism according to claim 1, wherein the coils are rectangular in shape.

9. An image pickup device, comprising:

a taking lens unit;

an image pickup element configured to convert an optical image formed by the taking lens unit into an electrical signal; and a lens driving mechanism configured to eccentrically drive a correcting lens including at least one lens or lens subunit, in a lens system constituting the taking lens unit in a plane perpendicular to an optical axis direction, the lens driving mechanism including a movable frame holding the correcting lens, a first and second electrical coil which are substantially rectangular and are fixedly disposed at a lens barrel where the taking lens unit is disposed, and magnetic circuit formation members generating a magnetic field that crosses the coils, the first and second coils are disposed completely surrounding the optical axis of the correcting lens when viewed in the optical axis direction of the taking lens unit, long axis directions of said first and second electrical coils are perpendicular to each other, and the two electrical coils overlap each other when viewed in the optical axis direction, said first electrical coil containing two short sides and two long sides, the length of the short side being smaller than the length of the long side, and said second electrical coil containing two short sides and two long sides, the length of the short side of the second coil being smaller than the length of the long side of the electrical coil, wherein when viewed in the optical axis direction the two short sides of the first electrical coil extend outside of both of the long sides of the second coil, and the two short sides of the second coil extend outside of both of the long sides of the first coil, and the magnetic circuit formation members include at least two magnets and yokes disposed at each of the two coils for generating movement forces in different directions perpendicular to the optical axis, the yokes opposing the respective magnets, either the magnets or the yokes being held by the movable frame, the other of the magnets and yokes being secured to the lens barrel.

10. The image pickup device according to claim 9, wherein the at least two magnets disposed at each of the first and second coil includes two magnets, the two magnets at one of the coils oppose each other at both ends of the coil in its long axis direction, and the two magnets at the other coil oppose each other at both ends of the other coil in its long axis direction.

11. The image pickup device according to claim 9, wherein the coils are rectangular in shape.

12. The image pickup device according to claim 9, wherein the at least two magnets are four magnets.

* * * * *